(12) United States Patent
Lu et al.

(10) Patent No.: US 11,877,184 B2
(45) Date of Patent: *Jan. 16, 2024

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Qianxi Lu, Guangdong (CN); Xin You, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,425

(22) Filed: Feb. 25, 2022

(65) Prior Publication Data
US 2022/0182880 A1 Jun. 9, 2022

Related U.S. Application Data

(63) Continuation of application No. 17/318,413, filed on May 12, 2021, now Pat. No. 11,363,492, which is a
(Continued)

(51) Int. Cl.
*H04W 28/06* (2009.01)
*H04W 12/0431* (2021.01)
(Continued)

(52) U.S. Cl.
CPC ............. *H04W 28/06* (2013.01); *H04L 1/189* (2013.01); *H04W 12/03* (2021.01); *H04W 12/0431* (2021.01); *H04W 80/02* (2013.01)

(58) Field of Classification Search
CPC . H04W 28/06; H04W 12/0431; H04W 12/03; H04W 80/02; H04L 1/189
(Continued)

(56) References Cited

U.S. PATENT DOCUMENTS 11,039,357 B2 *  6/2021  Park ................. H04W 74/0833
11,363,492 B2 *  6/2022  Lu .......................... H04W 12/03
(Continued)

FOREIGN PATENT DOCUMENTS

| CN | 1780475 A | 5/2006 |
|---|---|---|
| CN | 1798440 A | 7/2006 |

(Continued)

OTHER PUBLICATIONS

Examination report for European Application No. 18941239.8, dated Jun. 13, 2022 (6 pages).
(Continued)

*Primary Examiner* — Nghi H Ly
(74) *Attorney, Agent, or Firm* — Perkins Coie LLP

(57) ABSTRACT

Provided are a wireless communication method, a terminal device and a network device. The wireless communication method is used for the terminal device, and when the network device connected to the terminal device is switched from a source network device to a target network device, the connection between the terminal device and the source network device and the connection between the terminal device and the target network device are both maintained. Said method comprises: when the terminal device satisfies a first condition, releasing the connection between the terminal device and a source network device. In the implementations of the present application, during switching of the terminal device, the connection between the terminal device and the source network device and the connection between the terminal device and the target network device are both
(Continued)

maintained, effectively reducing the delay in the process of switching the network device connected to the terminal device from the source network device to the target network device.

10 Claims, 4 Drawing Sheets

Related U.S. Application Data continuation of application No. PCT/CN2018/117720, filed on Nov. 27, 2018.

(51) Int. Cl.
  *H04W 12/03* (2021.01)
  *H04L 1/1867* (2023.01)
  *H04W 80/02* (2009.01)
(58) Field of Classification Search
  USPC ............... 370/329, 328, 338, 341, 345, 350
  See application file for complete search history.

(56) References Cited

U.S. PATENT DOCUMENTS

| | | | | |
|---|---|---|---|---|
| 2009/0257399 | A1* | 10/2009 | Kuo | ................... H04W 12/03 370/331 |
| 2018/0083688 | A1 | 3/2018 | Agiwal et al. | |
| 2018/0227805 | A1 | 8/2018 | Jang et al. | |

FOREIGN PATENT DOCUMENTS

| | | |
|---|---|---|
| CN | 107438274 A | 12/2017 |
| CN | 108616945 A | 10/2018 |
| EP | 3358901 A1 | 8/2018 |
| EP | 3836614 A1 | 6/2021 |
| KR | 20180090658 A | 8/2018 |
| WO | 2017193940 A1 | 11/2017 |
| WO | 2019161099 A1 | 8/2019 |

OTHER PUBLICATIONS

First Office Action for Japanese Application No. 2021-527982, dated Jun. 4, 2022, with English translation (12 pages).
3GPP TSG-RAN WG2 Meeting #101, "NR Oms Interruption Ho," R2-1803662, Feb. 26, 2018 (8 pages).
Second Office Action for Chinese Application No. 202110822797.3, dated Jul. 13, 2022, with English translation (14 pages).
Corrected Notice of Allowability dated Apr. 1, 2022 of U.S. Appl. No. 17/318,413, filed May 12, 2021. 4 pages.
Corrected Notice of Allowability dated Feb. 1, 2022 of U.S. Appl. No. 17/318,413, filed May 12, 2021. 5 pages.
Corrected Notice of Allowability dated May 16, 2022 of U.S. Appl. No. 17/318,413, filed May 12, 2021. 4 pages.
Ericsson "Intra- and inter-eBN HO for eLWA without WT change" Tdoc R2-165476; 3GPP TSG-RAN WG2 #95; Gothenburg, Sweden, Aug. 22-26, 2016. 4 pages.
Ericsson "Triggers for RLC re-establishment" R2-080940; 3GPP TSG-RAN WG2 #61; Sorrento, Italy; Nov. 11-15, 2008. 3 pages.
Examination Report for Indian Application No. 202117022381 dated Mar. 7, 2022. 7 pages with English translation.
First Office Action for Chinese Application No. 202110822797.3 dated Apr. 13, 2022. 23 pages with English translation.
Non-Final Office Action dated Jul. 23, 2021 of U.S. Appl. No. 17/318,413, filed May 12, 2021. 20 pages.
Notice of Allowance dated Nov. 29, 2021 of U.S. Appl. No. 17/318,413, filed May 12, 2022. 7 pages.
OPPO "Discussion on user plane impact for DC-based Ho" R2-1816928; 3GPP TSG RAN2 Meeting #104; Spokane, USA; Nov. 12-16, 2018. 5 pages.
ZTE Corporation "Discussion on data forwarding in mobility enhancement solutions" R3-161144; 3GPP TSG-RAN WG3 Meeting #92; Nanjing, China; May 23-27, 2016. 5 pages.
3GPP TS 38.300 V16.3.0 (Sep. 2020)—3rd Generation Partnership Project; Technical Specification Group Radio Access Network; NR; NR and NG-RAN Overall Description; Stage 2 (Release 16) (148 pages).
3GPP TS 38.323 V16.2.0 (Sep. 2020)—3rd Generation Partnership Project; Technical Specification Group Radio Access Network; NR; Packet Data Convergence Protocol (PDCP) specification (Release 16) (40 pages).
3GPP TS 38.331 V16.3.1 (Jan. 2021)—3rd Generation Partnership Project; Technical Specification Group Radio Access Network; NR; Radio Resource Control (RRC) protocol specification (Release 16) (932 pages).
International Search Report dated Jul. 30, 2019 of PCT /CN2018/117720 (6 pages).
Extended European Search Report for European Application No. 18941239.8 dated Oct. 28, 2021. 9 pages.
Notification of Reason for Refusal for Korean Application No. 10-2021-7019395 dated Jan. 21, 2022. 11 pages with English translation.
Search report for European Application No. 23170194.7, dated Jul. 14, 2023 (9 pages).

* cited by examiner

A connection between a terminal device and a source network device is released when a first condition is satisfied ← S210

300

A PDCP protocol data unit (PDU) is sent or received by using a new secret key and/or robust header compression (RoHC) when a second condition is satisfied ← S310

WIRELESS COMMUNICATION METHOD, TERMINAL DEVICE AND NETWORK DEVICE

CROSS-REFERENCE TO RELATED APPLICATIONS

The present application is a continuation application of U.S. patent application Ser. No. 17/318,413 filed on May 12, 2021, which is a continuation application of International PCT Application No. PCT/CN2018/117720, having an international filing date of Nov. 27, 2018. The contents of the above-identified applications are hereby incorporated by reference.

TECHNICAL FIELD

Implementations of the present application relate to the field of communication, and more specifically, to a wireless communication method, a terminal device and a network device.

BACKGROUND

In an existing handover procedure, after a terminal device receives a Radio Resource Control (RRC) reconfiguration message, it will reconfigure Packet Data Convergence Protocol (PDCP)/Radio Link Control protocol (RLC)/Media Access Control (MAC)/low layer and the like according to handover configuration in the RRC reconfiguration message, so as to correspond to a stack of a target base station.

Since only one set of PDCP/RLC/MAC/low layer is maintained by the terminal device in the whole handover process, therefore, during the handover process, the terminal device needs to stop sending and receiving uplink/downlink (UL/DL) data at the same time at a source base station, and establish a connection with the target base station, thus a time delay is introduced.

Therefore, how to reduce a time delay of terminal device in a handover process is a technical problem to be solved urgently in this field.

SUMMARY

A wireless communication method, a terminal device and a network device are provided, which can effectively reduce a time delay in a process of switching the network device connected with the terminal device from a source network device to a target network device, and specify a detailed solution of releasing a connection between the terminal device and the source network device, as well as a data transmission method between the terminal device and the network device and the detailed solution of sending a status report by the terminal device.

In a first aspect, a wireless communication method is provided, which is applied to a terminal device. When a network device connected to the terminal device is switched from a source network device to a target network device, a connection between the terminal device and the source network device and a connection between the terminal device and the target network device are both maintained.

The method includes: releasing the connection between the terminal device and the source network device when the terminal device satisfies a first condition.

In a second aspect, a wireless communication method is provided, which is applied to a source network device. When a network device connected with a terminal device is switched from the source network device to a target network device, a connection between the terminal device and the source network device and a connection between the terminal device and the target network device are both maintained.

The method includes: releasing the connection between the source network device and the terminal device when the source network device satisfies a first condition.

In a third aspect, a wireless communication method is provided, which is applied to a terminal device. When a network device connected with the terminal device is switched from a source network device to a target network device, a connection between the terminal device and the source network device and a connection between the terminal device and the target network device are both maintained.

The method includes: sending and/or receiving a Packet Data Convergence Protocol (PDCP) Protocol Data Unit (PDU) by using a new secret key and/or Robust Header Compression (RoHC) to when the terminal device satisfies a second condition, wherein the new secret key and/or RoHC is different from an old secret key and/or RoHC, and the old secret key and/or RoHC is a secret key and/or RoHC which is used by the terminal device when communicating with the source network device and/or the target network device before the new secret key and/or robust header compression (RoHC) is used.

In a fourth aspect, a wireless communication method is provided, which is applied to a target network device. When a network device connected with a terminal device is switched from a source network device to the target network device, a connection between the terminal device and the source network device and a connection between the terminal device and the target network device are both maintained.

The method includes: sending and/or receiving a packet data convergence protocol (PDCP) protocol data unit (PDU) by using a new secret key and/or robust header compression (RoHC) to when the target network device satisfies a second condition, wherein the new secret key and/or RoHC is different from an old secret key and/or RoHC, and the old secret key and/or RoHC is a secret key and/or RoHC which is used by the terminal device when communicating with the source network device and/or the target network device before the new secret key and/or robust header compression (RoHC) is used.

In a fifth aspect, a wireless communication method is provided, which is applied to a source network device. When a network device connected with a terminal device is switched from the source network device to a target network device, a connection between the terminal device and the source network device and a connection between the terminal device and the target network device are both maintained.

The method includes: sending and/or receiving a packet data convergence protocol (PDCP) protocol data unit (PDU) by using a new secret key and/or robust header compression (RoHC) when the source network device satisfies a second condition, wherein the new secret key and/or RoHC is different from an old secret key and/or RoHC, and the old secret key and/or RoHC is a secret key and/or RoHC which is used by the terminal device when communicating with the source network device and/or the target network device before the new secret key and/or robust header compression (RoHC) is used.

In a sixth aspect, a wireless communication method is provided, which is applied to a terminal device. When a network device connected with a terminal device is switched from the source network device to a target network device, a connection between the terminal device and the source network device and a connection between the terminal device and the target network device are both maintained. The method includes: triggering the terminal device to send a packet data convergence protocol (PDCP) status report when the terminal device satisfies a third condition.

In a seventh aspect, a terminal device is provided, configured to perform the method in the above first aspect or each implementation thereof. Specifically, the terminal device includes function modules for performing the method in the above first aspect or each implementation thereof.

In an eighth aspect, a network device is provided, configured to perform the method in the above second aspect or each implementation thereof. Specifically, the network device includes function modules for performing the method in the above second aspect or each implementation thereof.

In a ninth aspect, a terminal device is provided, configured to perform the method in the above third aspect or various implementations thereof. Specifically, the terminal device includes function modules configured to perform the method in the above third aspect or each implementation thereof.

In a tenth aspect, a network device is provided, configured to perform the method in the above fourth aspect or each implementation thereof. Specifically, the network device includes function modules for performing the method in the above fourth aspect or each implementation thereof.

In an eleventh aspect, a network device is provided, configured to perform the method in the above fifth aspect or each implementation thereof. Specifically, the network device includes function modules for performing the method in the above fifth aspect or each implementation thereof.

In a twelfth aspect, a terminal device is provided, configured to perform the method in the above sixth aspect or each implementation thereof. Specifically, the terminal device includes function modules for performing the method in the above sixth aspect or each implementation thereof.

In a thirteenth aspect, a terminal device is provided, including a processor and a memory. The memory is configured to store a computer program, and the processor is configured to call and run the computer program stored in the memory to perform the method in the above first aspect or each implementation thereof.

In a fourteenth aspect, a network device is provided, including a processor and a memory. The memory is configured to store a computer program, and the processor is configured to call and run the computer program stored in the memory to perform the method in the above second aspect or each implementation thereof.

In a fifteenth aspect, a terminal device is provided, including a processor and a memory. The memory is configured to store a computer program, and the processor is configured to call and run the computer program stored in the memory to perform the method in the above third aspect or each implementations thereof.

In a sixteenth aspect, a network device is provided, including a processor and a memory. The memory is configured to store a computer program, and the processor is configured to call and run the computer program stored in the memory to perform the method in the above fourth aspect or each implementation thereof.

In a seventeenth aspect, a network device is provided, including a processor and a memory. The memory is configured to store a computer program, and the processor is configured to call and run the computer program stored in the memory to perform the method in the above fifth aspect or each implementation thereof.

In a eighteenth aspect, a terminal device is provided, including a processor and a memory. The memory is configured to store a computer program, and the processor is configured to call and run the computer program stored in the memory to perform the method in the above sixth aspect or each implementation thereof.

In a nineteenth aspect, a chip is provided, configured to implement the method in any one of the above first to sixth aspects or in various implementations thereof. Specifically, the chip includes a processor configured to call and run a computer program from a memory to enable a device disposed with the chip to perform the method in any one of the above first to sixth aspects or each implementation thereof.

In a twentieth the aspect, a computer-readable storage medium is provided, configured to store a computer program to cause a computer to perform the method in any one of the above first to sixth aspects or each implementation thereof.

In a twenty-first aspect, a computer program product is provided, including computer program instructions, and the computer program instructions cause a computer to perform the method in any one of the above first to sixth aspects or each implementation thereof.

In a twenty-second aspect, a computer program is provided, which, when run on a computer, causes the computer to perform the method in any one of the above first to sixth aspects or each implementation thereof.

Based on the technical solution, when a network device connected with a terminal device is switched from a source network device to a target network device, connections between the terminal device and the source network device as well as the target network device are maintained at the same time, which can effectively reduce a time delay in a process of switching the network device connected with the terminal device from the source network device to the target network device. In addition, a detailed solution of releasing the connection between the terminal device and the source network device, the data transmission method between the terminal device and the network device and the detailed solution of sending a status report by the terminal device are specified.

DETAILED DESCRIPTION

Figure 1:
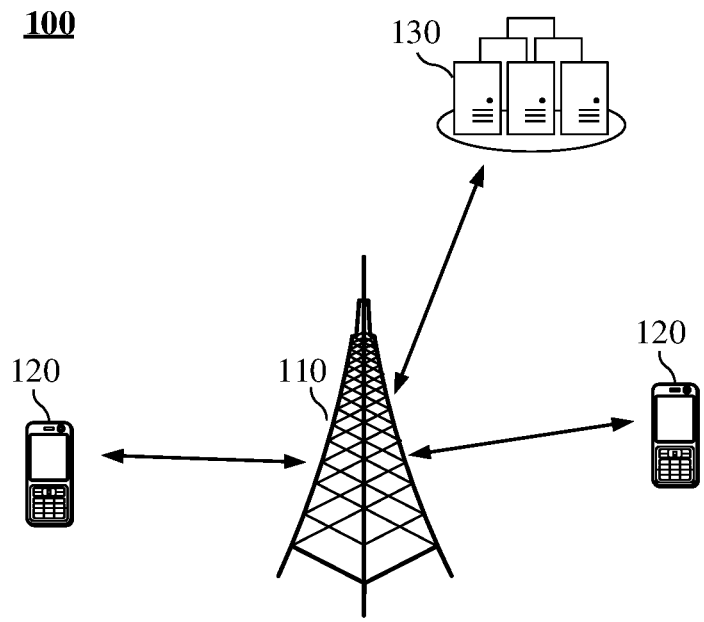
FIG. 1 is an example of an application scenario of the present application.

FIG. 1 shows a wireless communication system 100 to which an implementation of the present application is applied. The wireless communication system 100 may include a base station 110 and at least one terminal device 120 located within a coverage range of the base station 110.

The base station 110 may be a device that communicates with a terminal device.

The base station 110 may provide communication coverage for a specific geographic area and may communicate with the terminal device (e.g., UE) located within the coverage area. Optionally, the base station 110 may be a base station (gNB) in an NR system, or a radio controller in a Cloud Radio Access Network (CRAN), or the network device may be a relay station, an access point, a vehicle-mounted device, a wearable device, or a network device in a future evolved Public Land Mobile Network (PLMN), etc.

The terminal device 120 may be mobile or fixed. Optionally, the terminal device 120 may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolved PLMN, or the like.

The wireless communication system 100 also includes a core network device 130 that communicates with the base station.

The core network device 130 may be a 5G Core (5GC) device, such as an Access and Mobility Management Function (AMF), an Authentication Server Function (AUSF), or a User Plane Function (UPF), or a Session Management Function (SMF). Optionally, the core network device 130 may also be an Evolved Packet Core (EPC) device of an LTE network, for example, a Session Management Function+ Core Packet Gateway (SMF+PGW-C) device. It should be understood that SMF+PGW-C may realize the functions which can be realized by the SMF and the PGW-C at the same time.

FIG. 1 shows one base station, one core network device and two terminal devices as an example. Optionally, the wireless communication system 100 may include multiple base station devices and other quantity of terminal devices may be included in a coverage range of each base station, which is not limited in the implementations of the present application.

Figure 2:
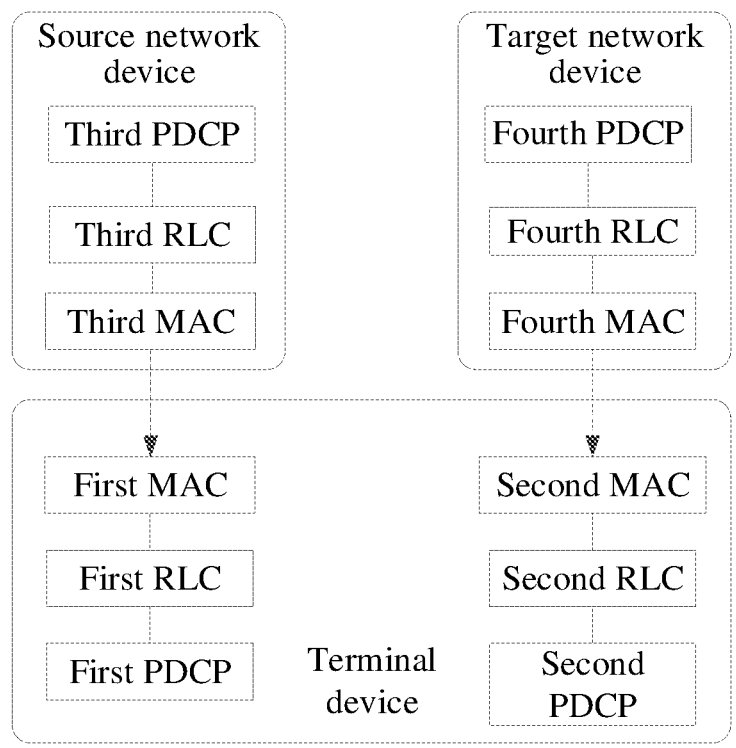
FIG. 2 is a DC architecture applicable to a wireless communication method according to an implementation of the present application.
Figures 3, 4, 5:
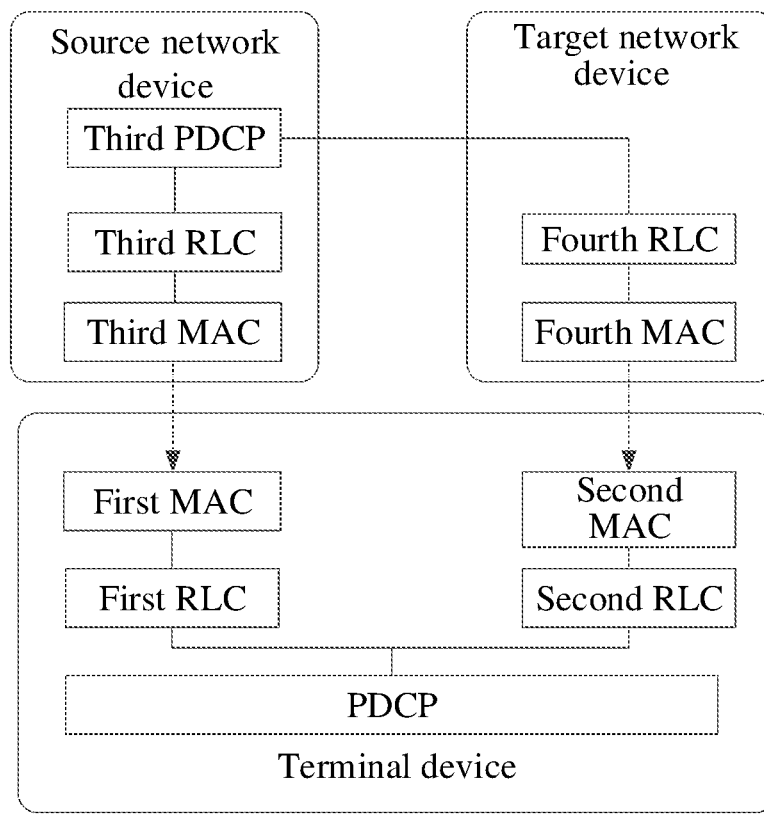
FIG. 3 is an eMBB architecture applicable to a wireless communication method according to an implementation of the present application.
FIG. 4 is a schematic flowchart of a wireless communication method according to implementations of the present application.
FIG. 5 is another schematic flowchart of a wireless communication method according to implementations of the present application.

FIG. 2 and FIG. 3 are examples of communication frameworks applicable to a wireless communication method according to an implementation of the present application.

It should be understood that the communication device shown in FIG. 2 and FIG. 3 may be the terminal device 120 as shown in FIG. 1, or the access network device 110 as shown in FIG. 1, and may further be the core network device 130 as shown in FIG. 1. Accordingly, the source network device or the target network device shown in FIG. 2 and FIG. 3 may be the terminal device 120 as shown in FIG. 1, or the access network device 110 as shown in FIG. 1, and may further be the core network device 130 as shown in FIG. 1. It should also be understood that the protocol architectures shown in FIG. 2 and FIG. 3 are only examples. However, the implementations of the present application are not limited thereto. For example, in other alternative implementations, the communication device may include more than two PDCP entities.

As shown in FIG. 2, the terminal device includes a first PDCP entity and a second PDCP entity as shown in FIG. 2.

Specifically, as shown in FIG. 2, the terminal device may include a first Packet Data Convergence Protocol (PDCP) entity, a first Radio Link Control (RLC) entity, a first Media Access Control (MAC) entity, a second PDCP entity, a second RLC entity and a second MAC entity. The source network device includes a third PDCP entity, a third RLC entity and a third MAC entity. The target network device may include a fourth PDCP entity, a fourth RLC entity, and a fourth MAC entity.

Specifically, the first PDCP entity of the terminal device passes through the first RLC entity and the first MAC entity, and then reaches the third MAC entity, the third RLC entity and the third PDCP entity of the source network device via an air interface. The second PDCP entity of the terminal device passes through the second RLC entity and the second MAC entity, and then reaches the fourth MAC entity, the fourth RLC entity and the fourth PDCP entity of the target network device via an air interface.

Optionally, in the framework shown in FIG. 2, communication may be performed between the third PDCP entity and the fourth PDCP entity.

Specifically, as shown in FIG. 3, the terminal device may only include one PDCP entity, and further, the terminal device may further include one PDCP entity, a first RLC entity, a first MAC entity, a second RLC entity and a second MAC entity. The source network device includes a third PDCP entity, a third RLC entity and a third MAC entity. The target network device may further include a fourth RLC entity and a fourth MAC entity.

Specifically, the PDCP entity of the terminal device passes through the first RLC entity and the first MAC entity, and then reaches the third MAC entity, the third RLC entity and the third PDCP entity of the source network device via an air interface. The PDCP entity of the terminal device further passes through the second RLC entity and the second MAC entity, and then reaches the fourth MAC entity and the fourth RLC entity of the target network device via an air interface, and then reaches the third PDCP entity of the source network device.

FIG. 4 is a schematic flow chart of a communication method according to an implementation of the present application.

As shown in FIG. 4, the method 200 may include S210.

In S210: when a first condition is satisfied, a connection between a terminal device and a source network device is released.

In some implementations of the present application, the communication method 300 is applicable to a terminal device. When the network device connected with the terminal device is switched from a source network device to a target network device, the connection between the terminal device and the source network device and the connection between the terminal device and the target network device are both maintained.

That is, when the terminal device satisfies the first condition, the connection between the terminal device and the source network device is released.

The first condition includes but is not limited to at least one of the following: the terminal device has received a handover command, the terminal device has initiated a random access procedure, or the terminal device has sent a handover completion message. Specifically, the handover command may be Radio Resource Control (RRC) reconfiguration information sent by the source network device to the terminal device.

Optionally, the random access procedure initiated by the terminal device includes at least one of the following cases: the terminal device has sent a message 1, the terminal device has received a message 2, the terminal device has sent a message 3, or the terminal device has received a message 4.

Optionally, after the terminal device satisfies the first condition for a certain time, the connection between the terminal device and the source network device is released.

In other implementations of the present application, the communication method shown in FIG. 4 is also applicable to a source network device. When the network device connected with the terminal device is switched from the source network device to the target network device, the connection between the terminal device and the source network device and the connection between the terminal device and the target network device are both maintained.

That is, when the source network device satisfies the first condition, the connection between the source network device and the terminal device is released.

Optionally, the first condition includes at least one of the following: the source network device has sent a handover command, or the source network device has received indication information sent by the terminal device or the target network device for indicating the source network device to disconnect the connection between the terminal device and the source network device.

The handover command may be RRC reconfiguration information sent by the source network device to the terminal device. That is, after the source network device sends the RRC reconfiguration information to the terminal device, the connection between the source network device and the terminal device is released.

For another example, the source network device releases the connection between the source network device and the terminal device after receiving the indication information sent by the terminal device. The terminal device sends the indication information to the source network device when at least one of the following conditions is met: the terminal device has received a handover command, the terminal device has initiated a random access procedure, the terminal device has sent a handover completion message, the terminal device has sent a message 1, the terminal device has received a message 2, the terminal device has sent a message 3, or the terminal device has received a message 4.

For another example, the source network device releases the connection between the source network device and the terminal device after receiving the indication information sent by the target network device. The target network device may send the indication information to the source network device after receiving handover completion information sent by the terminal device. Or, the target network device may send the indication information to the source network device after receiving at least one of the following messages: the target network device has received the message 1, the target network device has sent the message 2, the target network device has received the message 3, or the target network device has sent the message 4.

In other words, the time moment for triggering the target network device or the terminal device to send the indication information includes but is not limited to: a random access message.

For example, any one or at least one of the message 1, the message 2, the message 3 or the message 4.

Optionally, after the terminal device satisfies the first condition for a certain time, the connection between the terminal device and the source network device is released.

It should be understood that FIG. 4 is only an example of an implementation of the present application, and should not be considered as a limitation on the implementations of the present application.

For example, in other alternative implementations, the first condition may be other trigger conditions. For example, the first condition may be a message in a non-contention access process.

FIG. 5 is a schematic flowchart of another communication method according to an implementation of the present application.

As shown in FIG. 5, the method 300 may include S310.

In S310: when a second condition is satisfied, a PDCP protocol data unit (PDU) is sent or received by using a new secret key and/or RoHC. The new secret key and/or RoHC is different from an old secret key and/or RoHC, and the old secret key and/or RoHC is a secret key and/or RoHC which is used by the terminal device when communicating with the source network device and/or the target network device before the new secret key and/or robust header compression (RoHC) is used.

In some implementations of the present application, the communication method 300 may be applied to a terminal device. When a network device connected with the terminal device is switched from a source network device to a target network device, the connection between the terminal device and the source network device and the connection between the terminal device and the target network device are both maintained. Therefore, when the terminal device satisfies the second condition, the terminal device sends and/or receives a PDCP PDU by using the new secret key and/or RoHC.

Optionally, the terminal device send and/or receive the PDCP PDU by using the new secret key and/or RoHC after satisfying the second condition and after a certain time interval.

For example, after the terminal device satisfies the second condition and after a certain time interval, the terminal device sends the PDCP PDU sent by the source network device to the source network device and/or receives the PDCP PDU sent by the source network device by using the new secret key and/or RoHC.

For another example, after the terminal device satisfies the second condition and after a certain time interval, the terminal device sends the PDCP PDU sent by the target network device to the target network device and/or receives the PDCP PDU sent by the target network device by using the new secret key and/or RoHC.

It should be understood that the certain time interval may be a preset time period, or a time period negotiated by the terminal device with the source network device and/or the target network device, or a time period indicated by the network, which is not specifically limited in the implementations of the present application.

Optionally, within a certain time after the terminal device satisfies the second condition, the terminal device sends and/or receives the PDCP PDU by using the old secret key and/or RoHC.

For example, within a certain time after the terminal device satisfies the second condition, the terminal device sends the PDCP PDU sent by the source network device to the source network device and/or receives the PDCP PDU sent by the source network device by using the old secret key and/or RoHC.

For another example, within a certain time after the terminal device satisfies the second condition, the terminal device sends the PDCP PDU sent by the target network device to the target network device and/or receives the PDCP PDU sent by the target network device by using the old secret key and/or RoHC.

Optionally, the second condition includes at least one of the following: the terminal device has received a handover command, the terminal device has initiated a random access procedure, or the terminal device has sent a handover completion message.

Optionally, the random access procedure initiated by the terminal device includes at least one of the following cases: the terminal device has sent a message 1, the terminal device has received a message 2, the terminal device has sent a message 3 or the terminal device has received a message 4.

Optionally, the terminal device discards a first data packet, wherein the first data packet is a data packet that was not successfully sent before the terminal device satisfies the second condition and/or before a certain time point after the terminal device satisfies the second condition.

Optionally, the terminal device retransmits a first data packet, wherein the first data packet is a data packet that was not successfully sent before the terminal device satisfies the second condition and/or before a certain time point after the terminal device satisfies the second condition.

The specific implementation modes of retransmission of the first data packet by the terminal device will be described below.

Optionally, the terminal device retransmits the first data packet by using the new secret key and/or RoHC.

For example, the terminal device retransmits the first data packet to the source network device by using the new secret key and/or RoHC.

For another example, the terminal device retransmits the first data packet to the target network device by using the new secret key and/or RoHC.

Optionally, the terminal device retransmits the first data packet by using the old secret key and/or RoHC.

For example, the terminal device retransmits the first data packet to the source network device by using the old secret key and/or RoHC.

For another example, the terminal device retransmits the first data packet to the target network device using the old secret key and/or RoHC.

In other words, when the terminal device retransmits the first data packet, the terminal device may use the old secret key and/or RoHC, or may use the new secret key and/or RoHC, which is not limited in the implementations of the present application.

Further, when the terminal device retransmits the first data packet, the terminal device may retransmit the first data packet to the source network device or the target network device, which is not specifically limited in the implementations of the present application.

In a specific implementation, the terminal device encrypts and/or compresses the PDCP PDU corresponding to the first data packet according to the old secret key and/or ROHC or according to the new secret key and/or RoHC, and sends the encrypted and/or compressed PDCP PDU.

Optionally, the first data packet may include a PDCP PDU which has been sent by the terminal device and whose automatic repeat request acknowledgement (ARQ ACK) has not been received before the terminal device satisfies the second condition.

Optionally, the first data packet may include a PDCP PDU which has been sent by the terminal device and whose automatic repeat request acknowledgement (ARQ ACK) has not been received before a certain time point after the terminal device satisfies the second condition.

The above description is for an uplink retransmission of the terminal device, but the implementations of the present application are not limited thereto.

For example, the terminal device may further receive a retransmission data packet sent by the source network device and/or the target network device.

Optionally, the terminal device receives a second data packet retransmitted by the target network device by using the old secret key and/or ROHC, or by using the new secret key and/or RoHC.

Optionally, the target network device discards the second data packet.

The second data packet may be a data packet that was not successfully sent before the target network device satisfies the second condition and/or before a certain time point after the target network device satisfies the second condition.

For example, the second data packet includes a PDCP PDU which has been sent by the target network device and whose automatic repeat request acknowledgement (ARQ ACK) has not been received before the target network device satisfies the second condition, and/or the second data packet includes a PDCP PDU which has been sent by the target network device and whose ARQ ACK has not been received before a certain time point after the target network device satisfies the second condition.

Optionally, the terminal device receives a third data packet retransmitted by the source network device by using the old secret key and/or ROHC, or by using the new secret key and/or RoHC.

Optionally, the source network device discards the third data packet.

The third data packet may be a data packet that was not successfully sent before the target network device satisfies the second condition and/or before a certain time point after the target network device satisfies the second condition.

For example, the third data packet includes a PDCP PDU which has been sent by the source network device and whose automatic repeat request acknowledgement (ARQ ACK) has not been received before the source network device satisfies the second condition, and/or, the third data packet includes a PDCP PDU which has been sent by the source network device and whose ARQ ACK has not been received before a certain time point after the source network device satisfies the second condition.

In some other implementations of the present application, the communication method 300 may further be applied to a target network device. When a network device connected with the terminal device is switched from a source network device to a target network device, the connection between the terminal device and the source network device and the connection between the terminal device and the target network device are both maintained. Therefore, when the target network device satisfies the second condition, the target network device may send and/or receive a packet data convergence protocol (PDCP) protocol data unit (PDU) by using a new secret key and/or robust header compression (RoHC) to, wherein the new secret key and/or RoHC is different from the old secret key and/or RoHC, and the old secret key and/or RoHC is the secret key and/or RoHC which is used by the terminal device when communicating with the source network device and/or the target network device before the new secret key and/or robust header compression (RoHC) is used.

Optionally, the target network device sends and/or receives the PDCP PDU by using the new secret key and/or RoHC after satisfying the second condition and after a certain time interval.

Optionally, within a certain time after the target network device satisfies the second condition, the target network device sends and/or receives the PDCP PDU by using the old secret key and/or RoHC.

Optionally, the second condition includes at least one of the following:

the terminal device has initiated a random access procedure, or the target network device has received a handover completion message.

Optionally, the random access procedure initiated by the terminal device includes at least one of the following cases:

the target network device has received a message 1, the target network device has sent a message 2, the target network device has received a message 3, or the target network device has sent a message 4.

Optionally, the target network device receives a first data packet retransmitted by the terminal device.

The first data packet is a data packet that was not successfully sent before the terminal device satisfies the second condition and/or before a certain time point after the terminal device satisfies the second condition.

For example, the first data packet includes a PDCP PDU which has been sent by the terminal device and whose automatic repeat request acknowledgement (ARQ ACK) has not been received before the terminal device satisfies the second condition, and/or the first data packet includes a PDCP PDU which has been sent by the terminal device and whose automatic repeat request acknowledgement (ARQ ACK) has not been received before a certain time point after the terminal device satisfies the second condition.

Specifically, the target network device receives the first data packet retransmitted by the terminal device by using the old secret key and/or RoHC, or by using the new secret key and/or ROHC.

More specifically, the target network device receives the first data packet retransmitted by the terminal device, and decrypts and/or decompresses the first data packet according to the old secret key and/or RoHC, or according to the new secret key and/or ROHC.

Optionally, the target network device discards the second data packet.

Optionally, the target network device retransmits the second data packet to the terminal device.

The second data packet is a data packet that was not successfully sent before the target network device satisfies the second condition and/or before a certain time point after the target network device satisfies the second condition.

For example, the second data packet includes a PDCP PDU which has been sent by the target network device and whose automatic repeat request acknowledgement (ARQ ACK) has not been received before the target network device satisfies the second condition, and/or the second data packet includes a PDCP PDU which has been sent by the target network device and whose ARQ ACK has not been received before a certain time point after the target network device satisfies the second condition.

Specifically, the target network device retransmits the second data packet to the terminal device by using the old secret key and/or RoHC, or by using the new secret key and/or ROHC.

In other implementations of the present application, the method 300 may further be applied to a source network device. When a network device connected with a terminal device is switched from the source network device to a target network device, the connection between the terminal device and the source network device and the connection between the terminal device and the target network device are both maintained. Therefore, when the source network device satisfies the second condition, the source network device sends and/or receives a packet data convergence protocol (PDCP) protocol data unit (PDU) by using a new secret key and/or robust header compression (RoHC), wherein the new secret key and/or RoHC is different from the old secret key and/or RoHC, and the old secret key and/or RoHC is the secret key and/or RoHC which is used by the terminal device when communicating with the source network device and/or the target network device before the new secret key and/or robust header compression (RoHC) is used, wherein the new secret key and/or RoHC is different from an old secret key and/or RoHC, and the old secret key and/or RoHC is the secret key and/or RoHC which is used by the terminal device when communicating with the source network device and/or the target network device before the new secret key and/or robust header compression (RoHC) is used.

Optionally, the source network device sends and/or receives the PDCP PDU by using the new secret key and/or RoHC after satisfying the second condition and after a certain time interval.

Optionally, within a certain time after the source network device satisfies the second condition, the source network device sends and/or receives the PDCP PDU by using the old secret key and/or RoHC.

Optionally, the second condition includes at least one of the following:

the source network device has sent a handover command, or the source network device has received indication information sent by the terminal device or the target network device for indicating the source network device to send and/or receive the PDCP PDU by using the new secret key and/or RoHC.

Specifically, the source network device receives the indication information, and sends and/or receives indication information of PDCP PDU by using the new secret key and/or RoHC according to the indication information.

For example, the source network device receives the indication information sent by the terminal device when at least one of the following is satisfied: the terminal device has received a handover command, the terminal device has initiated a random access procedure, the terminal device has sent a handover completion message, the terminal device has sent a message 1, the terminal device has received a message 2, the terminal device has sent a message 3 or the terminal device has sent a message 4.

For another example, the source network device receives the indication information sent by the target network device when at least one of the following conditions is satisfied: the target network device has received handover completion information, the target network device has received the message 1, the target network device has sent the message 2, the target network device has received the message 3, or the target network device has sent the message 4.

Optionally, the source network device receives a first data packet retransmitted by the terminal device.

The first data packet is a data packet that was not successfully sent before the target network device satisfies the second condition and/or before a certain time point after the target network device satisfies the second condition.

For example, the first data packet includes a PDCP PDU which has been sent by the terminal device and whose Automatic Repeat-request (ARQ) acknowledgement (ACK) has not been received before the terminal device satisfies the second condition, and/or the first data packet includes a PDCP PDU which has been sent by the terminal device and whose automatic repeat request acknowledgement (ARQ ACK) has not been received before a certain time point after the terminal device satisfies the second condition.

Specifically, the target network device may receive the first data packet retransmitted by the terminal device by using the old secret key and/or RoHC, or by using the new secret key and/or ROHC.

More specifically, the source network device receives the first data packet retransmitted by the terminal device, and decrypts and/or decompresses the PDCP PDU corresponding to the first data packet according to the old secret key and/or RoHC or the new secret key and/or ROHC.

Optionally, the source network device discards a third data packet.

Optionally, the source network device retransmits the third data packet to the terminal device.

The third data packet is a data packet that was not successfully sent before the target network device satisfies the second condition and/or before a certain time point after the target network device satisfies the second condition.

For example, the third data packet includes a PDCP PDU which has been sent by the source network device and whose automatic repeat request acknowledgement (ARQ ACK) has not been received before the source network device satisfies the second condition, and/or the third data packet includes a PDCP PDU which has been sent by the source network device and whose ARQ ACK has not been received before a certain time point after the source network device satisfies the second condition.

Specifically, the source network device retransmits the third data packet to the terminal device by using the old secret key and/or RoHC, or by using the new secret key and/or ROHC.

Figure 6:
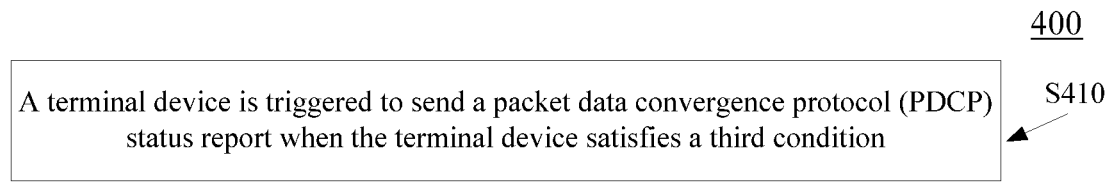
FIG. 6 is another schematic flowchart of a wireless communication method according to implementations of the present application.

FIG. 6 is a schematic flowchart of another communication method according to an implementation of the present application. The communication method 300 may be applied to a terminal device. When a network device connected with the terminal device is switched from a source network device to a target network device, the connection between the terminal device and the source network device and the connection between the terminal device and the target network device are both maintained; and the method 400 may include S410:

In S410, when the terminal device satisfies a third condition, the terminal device is triggered to send a packet data convergence protocol (PDCP) status report.

The PDCP status report may include the status of the PDCP PDU received by a PDCP receiving entity.

Optionally, the third condition includes at least one of the following:

the terminal device has received a handover command, the terminal device has initiated a random access procedure, or the terminal device has sent a handover completion message.

Optionally, the random access procedure initiated by the terminal device includes at least one of the following cases:

the terminal device has sent a message 1, the terminal device has received a message 2, the terminal device has sent a message 3 or the terminal device has received a message 4.

Optionally, the terminal device is triggered to send the PDCP status report after the terminal device satisfies the first condition for a certain time. It should be understood that the certain time interval may be a preset time period, a time period negotiated by the terminal device with the source network device and/or the target network device, or a time period indicated by the network, which is not specifically limited in the implementations of the present application.

Optionally, in other alternative implementations, the method 400 may be further applied to the source network device or the target network device.

For example, when the method 400 is applied to the source network device, when the source network device satisfies the third condition, the source network device is triggered to send the PDCP status report to the terminal device.

For another example, when the method 400 is applied to the target network device, when the target network device satisfies the third condition, the target network device is triggered to send the PDCP status report to the terminal device.

It should be understood that when the method 400 is applied to the source network device or the target network device, the third condition needs to be adaptively modified.

For example, when the method 400 is applied to the target network device, the third condition may be at least one of the following: the target network device has received the handover completion information, the target network device has received the message 1, the target network device has sent the message 2, the target network device has received the message 3, or the target network device has sent the message 4.

Similarly, when the method 400 is applied to the source network device, the third condition may be at least one of the following: the source network device has sent the handover command, or the source network device has received indication information sent by the terminal device or the target network device for indicating the source network device to send the PDCP status report.

The preferred implementations of the present application have been described in detail above with reference to the attached drawings, but the present application is not limited to the specific details in the above implementations. Within the technical conception of the present application, various simple variations can be made to the technical solutions of the present application, and these simple variations all belong to the protection scope of the present application.

For example, the specific technical features described in the above specific implementations can be combined in any suitable manner of there is no contradiction. In order to avoid unnecessary repetition, various possible combinations are not explained separately in the present application.

For another example, different implementations of the present application can be combined arbitrarily, as long as they do not violate the idea of the present application, they should also be regarded as contents disclosed in the present application.

It should be understood that sequence numbers of the foregoing processes do not mean execution sequences in various method implementations of the present application. The execution sequences of the processes should be determined according to functions and internal logic of the processes, and should not be construed as any limitation on the implementation processes of the implementations of the present application.

Method implementations of the present application are described in detail above in combination with FIGS. 1 to 6. Device implementations of the present application are described in detail below in combination with FIGS. 7 to 11.

Figure 7:
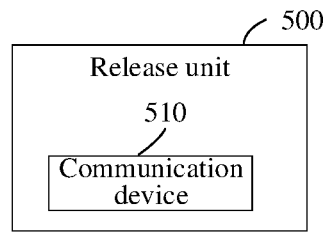
FIG. 7 is a schematic block diagram of a communications device according to implementations of the present application.

FIG. 7 is a schematic block diagram of a communication device 500 according to an implementation of the present application.

It should be understood that the communication device 500 may be a terminal device or a source network device for performing the method 200 shown in FIG. 4.

In some implementations of the present application, the communication device 500 may be a terminal device. When a network device connected with the terminal device is switched from a source network device to a target network device, the connection between the terminal device and the source network device and the connection between the terminal device and the target network device are both maintained. As shown in FIG. 7, the terminal device includes a release unit 510, wherein the release unit is configured to release the connection between the terminal device and the source network device when the terminal device satisfies a first condition.

Optionally, the first condition includes at least one of the following:

the terminal device has received a handover command, the terminal device has initiated a random access procedure, or the terminal device has sent a handover completion message.

Optionally, the random access procedure initiated by the terminal device includes at least one of the following cases:

the terminal device has sent a message 1, the terminal device has received a message 2, the terminal device has sent a message 3, or the terminal device has received a message 4.

Optionally, the release unit 510 is specifically configured to:

release the connection between the terminal device and the source network device after the terminal device satisfies the first condition for a certain time.

In some other implementations of the present application, the communication device 500 may be used as the source network device, and when the network device connected with the terminal device is switched from the source network device to the target network device, the connection between the terminal device and the source network device and the connection between the terminal device and the target network device are both maintained. The source network device includes the release unit 510, wherein the release unit is configured to release the connection between the source network device and the terminal device when the source network device satisfies a first condition.

Optionally, the first condition includes at least one of the following:

the source network device has sent a handover command, or the source network device has received indication information sent by the terminal device or the target network device for indicating the source network device to disconnect the connection between the terminal device and the source network device.

Optionally, the terminal device further includes:

a communication unit, configured to receive the indication information.

Optionally, the communication unit is specifically configured to: receive the indication information sent by the terminal device when at least one of the following is satisfied: the terminal device has received a handover command, the terminal device has initiated a random access procedure, the terminal device has sent a handover completion message, the terminal device has sent a message 1, the terminal device has received a message 2, the terminal device has sent a message 3, or the terminal device has sent a message 4.

Optionally, the communication unit is specifically configured to: receive the indication information sent by the target network device when at least one of the following conditions is satisfied: the target network device has received handover completion information, the target network device has received the message 1, the target network device has sent the message 2, the target network device has received the message 3, or the target network device has sent message 4.

Optionally, the release unit is specifically configured to: release the connection between the terminal device and the source network device after the terminal device satisfies the first condition for a certain time.

Figure 8:
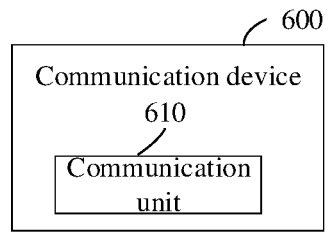
FIG. 8 is another schematic block diagram of a communications device according to implementations of the present application.

FIG. 8 is a schematic block diagram of a communication device 600 according to an implementation of the present application.

In some implementations of the present application, the communication device 600 may be a terminal device.

Specifically, when a network device connected with the terminal device is switched from a source network device to a target network device, the connection between the terminal device and the source network device and the connection between the terminal device and the target network device are both maintained. The terminal device includes a communication unit 610; wherein when the terminal device satisfies a second condition, the communication unit 610 sends and/or receives packet data convergence protocol (PDCP) protocol data unit (PDU) by using a new secret key and/or robust header compression (RoHC), wherein the new secret key and/or RoHC is different from an old secret key and/or RoHC and the old secret key and/or RoHC is the secret key and/or RoHC which is used by the terminal device when communicating with the source network device and/or the target network device before the new secret key and/or robust header compression (RoHC) is used.

Optionally, the communication unit 610 is specifically configured to: send and/or receive the PDCP PDU by using the new secret key and/or RoHC after the terminal device satisfies the second condition and after a certain time interval.

Optionally, the communication unit 610 is further configured to: send and/or receive the PDCP PDU by using the old secret key and/or RoHC within a certain time after the terminal device satisfies the second condition.

Optionally, the second condition includes at least one of the following: the terminal device has received a handover command, the terminal device has initiated a random access procedure, or the terminal device has sent a handover completion message.

Optionally, the random access procedure initiated by the terminal device includes at least one of the following cases: the terminal device has sent a message 1, the terminal device has received a message 2, the terminal device has sent a message 3, or the terminal device has received a message 4.

Optionally, the communication unit 610 is further configured to: discard a first data packet, wherein the third data packet is a data packet that was not successfully sent before the terminal device satisfies the second condition and/or before a certain time point after the terminal device satisfies the second condition.

Optionally, the communication unit 610 is further configured to: retransmit a first data packet, wherein the third data packet is a data packet that was not successfully sent before the terminal device satisfies the second condition and/or before a certain time point after the terminal device satisfies the second condition.

Optionally, the communication unit 610 is specifically configured to: retransmit the first data packet by using the new secret key and/or RoHC.

Optionally, the communication unit 610 is specifically configured to: retransmit the first data packet by using the old secret key and/or RoHC.

Optionally, the communication unit 610 is specifically configured to: encrypt and/or compress the PDCP PDU corresponding to the first data packet according to the old secret key and/or ROHC or according to the new secret key and/or RoHC, and send the encrypted and/or compressed PDCP PDU.

Optionally, the first data packet includes a PDCP PDU which has been sent by the terminal device and whose automatic repeat request acknowledgement (ARQ ACK) has not been received before the terminal device satisfies the second condition, and/or the first data packet includes a PDCP PDU which has been sent by the terminal device and whose automatic repeat request acknowledgement (ARQ ACK) has not been received before a certain time point after the terminal device satisfies the second condition.

Optionally, the communication unit is further configured to: receive a second data packet retransmitted by the target network device by using the old secret key and/or ROHC, or by using the new secret key and/or RoHC.

Optionally, the communication unit is further configured to: receive a third data packet retransmitted by the source network device by using the old secret key and/or ROHC, or by using the new secret key and/or RoHC.

In some implementations of the present application, the communication device 600 may be a target network device.

Specifically, when a network device connected with a terminal device is switched from a source network device to the target network device, the connection between the terminal device and the source network device and the connection between the terminal device and the target network device are both maintained. The network device includes the communication unit 610; wherein when the target network device satisfies a second condition, the communication unit 610 sends and/or receives a packet data convergence protocol (PDCP) protocol data unit (PDU) by using a new secret key and/or robust header compression (RoHC), wherein the new secret key and/or RoHC is different from an old secret key and/or RoHC, and the old secret key and/or RoHC is a secret key and/or RoHC which is used by the terminal device when communicating with the source network device and/or the target network device before the new secret key and/or robust header compression (RoHC) is used.

Optionally, the communication unit 610 is specifically configured to: send and/or receive the PDCP PDU by using the new secret key and/or RoHC after the target network device satisfies the second condition and after a certain time interval.

Optionally, the communication unit 610 is further configured to: send and/or receive the PDCP PDU by using the old secret key and/or RoHC within a certain time after the target network device satisfies the second condition.

Optionally, the second condition includes at least one of the following: the terminal device has initiated a random access procedure, or the target network device has received a handover completion message.

Optionally, the random access procedure initiated by the terminal device includes at least one of the following cases: the target network device has received a message 1, the target network device has sent a message 2, the target network device has received a message 3, or the target network device has sent a message 4.

Optionally, the communication unit 610 is further configured to: receive a first data packet retransmitted by the terminal device.

Optionally, the communication unit 610 is specifically configured to: receive the first data packet retransmitted by the terminal device by using the old secret key and/or ROHC, or by using the new secret key and/or RoHC.

Optionally, the communication unit 610 is more specifically configured to: receive the first data packet retransmitted by the terminal device, and decrypt and/or decompress the first data packet according to the old secret key and/or RoHC, or according to the new secret key and/or ROHC.

Optionally, the communication unit 610 is further configured to: discard a second data packet, wherein the second data packet is a data packet that was not successfully sent before the target network device satisfies the second condition and/or before a certain time point after the target network device satisfies the second condition.

Optionally, the communication unit 610 is further configured to: retransmit a second data packet to the terminal device, wherein the second data packet is a data packet that was not successfully sent before the target network device satisfies the second condition and/or before a certain time point after the target network device satisfies the second condition.

Optionally, the communication unit 610 is specifically configured to: retransmit the second data packet to the terminal device by using the old secret key and/or ROHC, or by using the new secret key and/or RoHC.

Optionally, the second data packet includes a PDCP PDU which has been sent by the target network device and whose automatic repeat request acknowledgement (ARQ ACK) has not been received before the target network device satisfies the second condition, and/or the second data packet includes a PDCP PDU which has been sent by the target network device and whose ARQ ACK has not been received before a certain time point after the target network device satisfies the second condition.

In some implementations of the present application, the communication device 600 may be a source network device.

Specifically, when a network device connected with a terminal device is switched from the source network device to a target network device, the connection between the terminal device and the source network device and the connection between the terminal device and the target network device are both maintained. The network device includes the communication unit 610; wherein when the target network device satisfies a second condition, the communication unit 610 sends and/or receives a packet data convergence protocol (PDCP) protocol data unit (PDU) by using a new secret key and/or robust header compression (RoHC), wherein the new secret key and/or RoHC is different from an old secret key and/or RoHC, and the old secret key and/or RoHC is a secret key and/or RoHC which is used before updating during communication of the terminal device/the target network device.

Optionally, the communication unit 610 is specifically configured to: send and/or receive the PDCP PDU by using the new secret key and/or RoHC after the target network device satisfies the second condition and after a certain time interval.

Optionally, the communication unit 610 is further configured to: send and/or receive the PDCP PDU by using the old secret key and/or RoHC within a certain time after the target network device satisfies the second condition.

Optionally, the second condition includes at least one of the following: the target network device has sent a handover command, or the source network device has received indication information sent by the terminal device or the target network device for indicating the source network device to send and/or receive the PDCP PDU by using the new secret key and/or RoHC.

Optionally, the communication unit 610 is further configured to: receive the indication information.

Optionally, the communication unit 610 is specifically configured to: receive the indication information sent by the terminal device when at least one of the following is satisfied: the terminal device has received the handover command, the terminal device has initiated a random access procedure, the terminal device has sent a handover completion message, the terminal device has sent a message 1, the terminal device has received a message 2, the terminal device has sent a message 3, or the terminal device has sent a message 4.

Optionally, the communication unit 610 is specifically configured to: receive indication information sent by the target network device when at least one of the following conditions is satisfied: the target network device has received handover completion information, the target network device has received the message 1, the target network device has sent the message 2, the target network device has received the message 3, and the target network device has sent the message 4.

Optionally, the communication unit 610 is further configured to: receive a first data packet retransmitted by the terminal device.

Optionally, the communication unit 610 is specifically configured to: receive the first data packet retransmitted by the terminal device by using the old secret key and/or ROHC, or by using the new secret key and/or RoHC.

Optionally, the communication unit 610 is more specifically configured to: receive the first data packet retransmitted by the terminal device, and decrypt and/or decompress the PDCP PDU corresponding to the first data packet according to the old secret key and/or RoHC, or according to the new secret key and/or ROHC.

Optionally, the communication unit 610 is further configured to: discard a third data packet, wherein the third data packet is a data packet that was not successfully sent before the source network device satisfies the second condition and/or before a certain time point after the source network device satisfies the second condition.

Optionally, the communication unit 610 is further configured to: retransmit a third data packet to the terminal device, wherein the third data packet is a data packet that was not successfully sent before the source network device satisfies the second condition and/or before a certain time point after the source network device satisfies the second condition.

Optionally, the communication unit 610 is specifically configured to: retransmit the third data packet to the terminal device by using the old secret key and/or ROHC, or by using the new secret key and/or RoHC.

Optionally, the third data packet includes a PDCP PDU which has been sent by the source network device and whose automatic repeat request acknowledgement (ARQ ACK) has not been received before the source network device satisfies the second condition, and/or the third data packet includes a PDCP PDU which has been sent by the source network device and whose ARQ ACK has not been received before a certain time point after the source network device satisfies the second condition.

Figure 9:
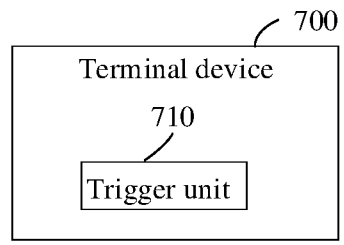
FIG. 9 is a schematic block diagram of a terminal device according to an implementation of the present application.

FIG. 9 is a schematic block diagram of a terminal device 700 according to an implementation of the present application. Optionally, when a network device connected with the terminal device is switched from a source network device to a target network device, the connection between the terminal device and the source network device and the connection between the terminal device and the target network device are both maintained.

As shown in FIG. 9, the terminal device 700 may include: a trigger unit 710; wherein when the terminal device satisfies a first condition, the trigger unit is configured to trigger the terminal device to send a packet data convergence protocol (PDCP) status report.

Optionally, the first condition includes at least one of the following: the terminal device has received a handover command, the terminal device has initiated a random access procedure, or the terminal device has sent a handover completion message.

Optionally, the random access procedure initiated by the terminal device includes at least one of the following cases: the terminal device has sent a message 1, the terminal device has received a message 2, the terminal device has sent a message 3, or the terminal device has received a message 4.

Optionally, the trigger unit 710 is specifically configured to: trigger the terminal device to send the PDCP status report after the terminal device satisfies the first condition for a certain time.

It should be understood that the apparatus implementations may correspond to the method implementations with each other, and description of the method implementations may be referred to for similar description of the apparatus implementations. Specifically, the communication device 500 shown in FIG. 7 may correspond to a corresponding entity performing the method 200 of the implementation of the present application, the communication device 600 shown in FIG. 8 may correspond to a corresponding entity performing the method 300 of the implementation of the present application, and the communication device 700 shown in FIG. 9 may correspond to a corresponding entity performing the method 400 of the implementation of the present application, which is not repeated here again for the sake of brevity.

The communication device according to an implementation of the present application is described from a perspective of functional module above with reference to FIGS. 7 to 9. It should be understood that the functional module may be realized in form of hardware, or instructions in form of software, or a combination of hardware and software modules.

Specifically, each act of the method implementations in the implementations of the present application can be implemented by hardware integrated logic circuits and/or instructions in the form of software in a processor, and the acts of methods disclosed with reference to the implementations of the present application may be directly executed and implemented by a hardware decoding processor, or may be implemented by a combination of hardware and software modules in the decoding processor.

Optionally, the software modules may be located in a storage medium commonly used in the art, such as a random access memory, a flash memory, a read-only memory, a programmable read-only memory, an electrically erasable programmable memory, or a register, etc. The storage medium is located in the memory, and the processor reads information in the memory and completes the acts of the above method implementations in combination with its hardware.

For example, in an implementation of the present application, the release unit shown in FIG. 7 may be implemented by a processor, and the communication unit 610 shown in FIG. 8 and the trigger unit 710 shown in FIG. 9 may be implemented by transceivers.

Figure 10:
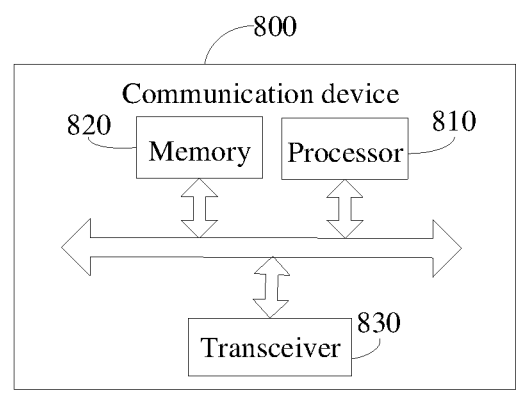
FIG. 10 is a schematic block diagram of a communication device according to an implementation of the present application.

FIG. 10 is a schematic diagram of a structure of a communication device 800 according to an implementation of the present application. The communication device 800 shown in FIG. 10 includes a processor 810, wherein the processor 810 may call and run a computer program from a memory to implement the method in an implementation of the present application.

Optionally, as shown in FIG. 10, the communication device 800 may further include a memory 820. The memory 820 may be configured to store indication information, or may be configured to store codes, instructions, etc., executed by the processor 810. The processor 810 may call and run a computer program from the memory 820 to implement the method in the implementation of the present application.

Herein, the memory 820 may be a separate device independent of the processor 810 or may be integrated in the processor 810.

Optionally, as shown in FIG. 10, the communication device 800 may further include a transceiver 830, and the processor 810 may control the transceiver 830 to communicate with another device. Specifically, information or data may be sent to another device or information or data sent by another device is received.

Herein, the transceiver 830 may include a transmitter and a receiver. The transceiver 830 may also further include antennas, and a quantity of antennas may be one or more.

Optionally, the communication device 800 may be a source network device or a target network device according to an implementation of the present application, and the communication device 800 may implement corresponding processes implemented by the source network device or the target network device in various methods of the implementations of the present application. That is to say, the communication device 800 according to an implementation of the present application may correspond to the corresponding entity performing the methods 200 to 400 according to the implementations of the present application, which is not repeated here again for the sake of brevity.

Optionally, the communication device 800 may be a terminal device according to an implementation of the present application, and the communication device 800 may implement the corresponding processes implemented by the terminal device in various methods of the implementations of the present application. That is to say, the communication device 800 according to an implementation of the present application may correspond to the corresponding entity performing the methods 200 to 400 according to the implementations of the present application, which is not repeated here again for the sake of brevity.

It should be understood that the various components in the communication device 800 are connected through a bus system. In addition to a data bus, the bus system further includes a power bus, a control bus, a status signal bus, etc.

In addition, an implementation of the present application further provides a chip, which may be an integrated circuit chip with a signal processing capability, and can implement or execute the methods, acts and logic block diagrams disclosed in the implementations of the present application.

Optionally, the chip may be applied to various communication devices, so that the communication devices with the chip installed therein can perform the disclosed methods, acts and logic block diagrams in the implementations of the present application.

Figure 11:
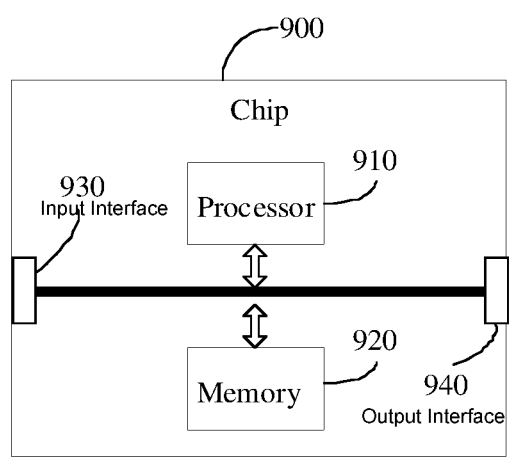
FIG. 11 is a schematic block diagram of a chip according to an implementation of the present application.

FIG. 11 is a schematic diagram of a structure of a chip according to an implementation of the present application.

A chip 900 shown in FIG. 11 includes a processor 910. The processor 910 may call and run a computer program from a memory to implement the method in the implementation of the present application.

Optionally, as shown in FIG. 11, the chip 900 may further include a memory 920. Herein, the processor 910 may call and run a computer program from the memory 920 to implement the method in the implementation of the present application. The memory 920 may be configured to store indication information, or may be configured to store codes, instructions, etc., executed by the processor 910.

Herein, the memory 920 may be a separate device independent of the processor 910 or may be integrated in the processor 910.

Optionally, the chip 900 may further include an input interface 930. The processor 910 may control the input interface 930 to communicate with another device or chip. Specifically, information or data sent by another device or chip may be acquired.

Optionally, the chip 900 may further include an output interface 940. The processor 910 may control the output interface 940 to communicate with another device or chip. Specifically, information or data may be output to another device or chip.

Optionally, the chip may be applied in a network device of the implementation of the present application, and the chip may implement the corresponding processes implemented by the network device in various methods of the implementations of the present application, which is not repeated here again for brevity.

Optionally, the chip may be applied to a terminal device in an implementation of the present application, and the chip may implement the corresponding processes implemented by the terminal device in various methods of the implementations of the present application, which is not repeated here again for the sake of brevity.

It should be understood that the chip mentioned in the implementation of the present application may also be referred to as a system-level chip, a system chip, a chip system or a system-on-chip, etc. It should also be understood that the various components in the chip 900 are connected through a bus system. Herein, in addition to a data bus, the bus system further includes a power bus, a control bus, a status signal bus, etc.

The processor may include, but is not limited to: a general purpose processor, a digital signal processor (DSP), an application specific integrated circuit (ASIC), a field programmable gate array (FPGA), or another programmable logic device, a discrete gate or a transistor logic device, or a discrete hardware component, etc.

The processor may be configured to implement or perform methods, acts and logical block diagrams disclosed in the implementations of the present application. The acts of the method disclosed with reference to the implementation of the present application may be directly embodied as executed and completed by a hardware decoding processor, or may be executed and completed by a combination of hardware and software modules in a decoding processor. The software modules may be located in a storage medium commonly used in the art, such as a random access memory, a flash memory, a read-only memory, a programmable read-only memory or an erasable programmable memory, a register, etc. The storage medium is located in a memory, and the processor reads information in the memory and completes the acts of the above method in combination with its hardware.

The memory includes but is not limited to: a volatile memory and/or a non-volatile memory. Herein, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. Through an exemplary but not limitative description, many forms of RAMs may be used, for example, a Static RAM (SRAM), a Dynamic RAM (DRAM), a Synchronous DRAM (SDRAM), a Double Data Rate SDRAM (DDRS-DRAM), an Enhanced SDRAM (ESDRAM), a Synchlink DRAM (SLDRAM), and a Direct Rambus RAM (DR-RAM).

It should be noted that the memory in the systems and the methods described in this specification are aimed at including but being not limited to these and any memory of another suitable type.

An implementation of the present application further provides a computer readable storage medium, configured to store a computer program. The computer readable storage medium stores one or more programs including instructions which, when executed by a portable electronic device including multiple application programs, enables the portable electronic device to perform the methods of the implementations shown as methods 200 to 400.

Optionally, the computer readable storage medium may be applied in a network device of an implementation of the present application, and the computer program enables ae computer to perform the corresponding processes implemented by the network device in various methods of implementations of the present application, which is not repeated here again for the sake of brevity.

Optionally, the computer readable storage medium may be applied in a mobile terminal/terminal device of an implementation of the present application, and the computer program enables the computer to perform the corresponding processes implemented by the mobile terminal/terminal device in various methods of implementations of the present application, which is not repeated here again for the sake of brevity.

An implementation of the present application further provides a computer program product, including a computer program.

Optionally, the computer readable storage medium may be applied in a network device of an implementation of the present application, and the computer program enables the computer to perform the corresponding processes implemented by the network device in various methods of implementations of the present application, which is not repeated here again for the sake of brevity.

Optionally, the computer readable storage medium may be applied in a mobile terminal/terminal device of an implementation of the present application, and the computer program enables the computer to perform the corresponding processes implemented by the mobile terminal/terminal device in various methods of implementations of the present application, which is not repeated here again for the sake of brevity.

An implementation of the present application further provides a computer program. When the computer program is executed by a computer, the computer can perform the method of the implementations shown as the methods 200 to 400.

Optionally, the computer program may be applied in a network device of an implementation of the present application. When the computer program is run on the computer, the computer is enabled to perform the corresponding processes implemented by the network device in various methods of implementations of the present application, which is not repeated here again for the sake of brevity.

An implementation of the application further provides a communication system, which includes the terminal device, the source network device and the target network device as described above.

It should be noted that the term "system" in this specification may also be referred to as "network management architecture" or "network system", etc.

It should also be understood that the terms used in implementations of the present application and the appended claims are for the purpose of describing specific implementations only but are not intended to limit implementations of the present application.

For example, the singular forms "a", "said", "the above" and "the" used in the implementations of the present application and the appended claims are also intended to include the plural forms unless the context clearly indicates other meanings.

Those skilled in the art may recognize that the exemplary elements and algorithm acts described in combination with the implementations disclosed herein can be implemented in electronic hardware, or a combination of computer software and electronic hardware. Whether these functions are executed in hardware or software depends on a particular application and a design constraint condition of a technical solution. Those skilled in the art may use different methods to implement the described functions in respect to each particular application, but such realization should not be considered to be beyond the scope of implementations of the present application.

The function units may be stored in a computer readable storage medium if realized in a form of software functional units and sold or used as a separate product. Based on this understanding, the technical solution of implementations of the present application, in essence, or the part contributing to the existing art, or a part of the technical solution, may be embodied in a form of a software product. The computer software product is stored in a storage medium, including a number of instructions for enabling a computer device (which may be a personal computer, a server, or a network device, or the like.) to perform all or part of the acts of the methods described in various implementations of the present application. And the aforementioned storage medium includes various kinds of media that may store program codes, such as a USB flash disk, a removable hard disk, a Read-Only Memory (ROM), a Random Access Memory (RAM), a magnetic disk or an optical disk, etc.

Those skilled in the art may clearly learn that for convenience and conciseness of description, the specific working processes of the systems, apparatuses and units described above may refer to the corresponding processes in the aforementioned method implementations and is not repeated here again.

In several implementations provided by the present application, it should be understood that the disclosed systems, devices and methods may be implemented in another mode. For example, the division of the units, modules or components in the above-mentioned device implementations is only a logical function division, and there may be another division mode in an actual realization. For example, multiple units, modules or components may be combined or integrated into another system, or some units or components may be ignored or not executed.

For another example, the units/modules/components described above as separate/display components may or may not be physically separated, i.e., they may be located in one place or may be distributed over multiple network units. Part or all of the units/modules/components therein may be selected according to an actual requirement to achieve a purpose of a solution the implementations of the present application.

Finally, it should be noted that the mutual coupling or direct coupling or communication connection shown or discussed in the above may be indirect coupling or communication connection through some interface, apparatus or unit, and may be in electrical, mechanical or other forms.

What are described above are merely specific implementations of the present application, but the protection scope of implementations of the present application is not limited thereto. Any variation or substitution that may be easily conceived by a person skilled in the art within the technical scope disclosed by the present application shall be included within the protection scope of the present application. Therefore, the protection scope of the implementations of the present application shall be determined by the protection scope of the claims.

What is claimed is:

1. A method for wireless communication, applied to a Packet Data Convergence Protocol (PDCP) entity in a target network device,
   wherein when a terminal device is switched from a source network device to the target network device, a connection between the terminal device and the source network device and a connection between the terminal device and the target network device are both maintained;
   the method comprises:
   after sending a message 4 of a random access procedure to the terminal device, receiving a PDCP protocol data unit (PDU) by using a new secret key and a new robust header compression (RoHC) in response to a determination that (1) the terminal device has received a handover command, (2) the terminal device has initiated a random access procedure, or (3) the terminal device has sent a handover completion message,
   wherein the new secret key is different from an old secret key, and wherein the new RoHC is different from an old RoHC, and wherein the old secret key and the old RoHC have been used for communication between the terminal device and the source network device.

2. The method of claim 1, further comprising:
   determining that a condition that the terminal device has initiated the random access procedure.

3. The method of claim 1, wherein a first data packet comprising a PDCP PDU has been sent by the terminal device and whose automatic repeat request acknowledgement (ARQ ACK) has not been received before the terminal device has received the message 4 of the random access procedure.

4. The method of claim 3, wherein the method further comprises:
   receiving, by the target network device, the first data packet retransmitted by the terminal device,
   wherein, receiving, by the target network device, the first data packet comprises:
   decrypting and/or decompressing, by the target network device, the first data packet according to the new secret key and the new ROHC.

5. The method of claim 1, wherein receiving a packet data convergence protocol (PDCP) protocol data unit (PDU) comprises:
   receiving the PDCP PDU from at least two Radio Link Control protocol (RLC) entities.

6. A network device, wherein the network device is used a target network device, comprising a Packet Data Convergence Protocol (PDCP) entity,
   wherein when a terminal device is switched from a source network device to the target network device, a connection between the terminal device and the source network device and a connection between the terminal device and the target network device are both maintained;
   the target network device further comprises a memory and a processor, wherein the processor is configured to execute instructions stored in the memory to perform following operations comprising:
   after sending a message 4 of a random access procedure to the terminal device, receiving a PDCP protocol data unit (PDU) by using a new secret key and a new robust header compression (RoHC) in response to a determination that (1) the terminal device has received a handover command, (2) the terminal device has initiated a random access procedure, or (3) the terminal device has sent a handover completion message,
   wherein the new secret key is different from an old secret key, and wherein the new RoHC is different from an old RoHC, and wherein the old secret key and the old RoHC have been used for communication between the terminal device and the source network device.

7. The network device of claim 6, wherein receiving the PDCP PDU comprises:
   determining that a condition that the terminal device has initiated the random access procedure.

8. The network device of claim 7, wherein a first data packet comprising a PDCP PDU has been sent by the terminal device and whose automatic repeat request acknowledgement (ARQ ACK) has not been received before the terminal device has received the message 4 of the random access procedure.

9. The network device of claim 8, wherein the processor is specially configured to execute instructions stored in the memory to perform following operation:
   receiving the first data packet retransmitted by the terminal device, and
   decrypting and/or decompressing the first data packet according to the new secret key and/or ROHC.

10. The network device of claim 6, wherein the processor is further configured to execute instructions stored in the memory to perform following operation:
    receiving the PDCP PDU from at least two Radio Link Control protocol (RLC) entities.

* * * * *